W. H. & G. Yates,
Sawing Shingles,
Nº 23,522.    Patented Apr. 5, 1859.

Witnesses:
Peter Walrath
James Finch

Inventor:
W. H. Yates
George Yates

UNITED STATES PATENT OFFICE.

WM. H. YATES AND GEO. YATES, OF CHITTENANGO, NEW YORK.

METHOD OF SAWING SHINGLES FROM THE BOLT.

Specification of Letters Patent No. 23,522, dated April 5, 1859.

*To all whom it may concern:*

Be it known that we, WILLIAM H. YATES and GEORGE YATES, both of Chittenango, in the county of Madison and State of New York, have invented certain new and useful Improvements in Machinery for Cutting or Sawing Shingles; and we do hereby declare that the following is a full, clear, and exact description of the same, reference being had to the annexed drawings, making a part of this specification, in which—

Figure 1:
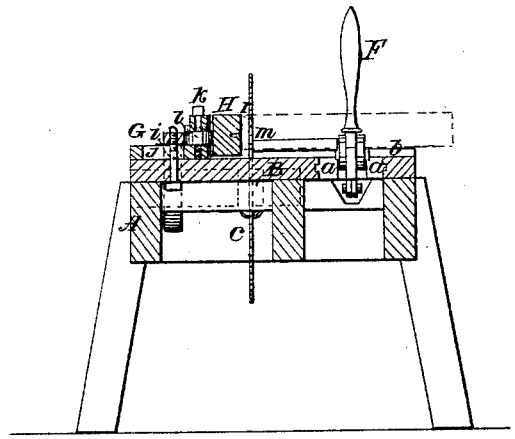
Figure 2:
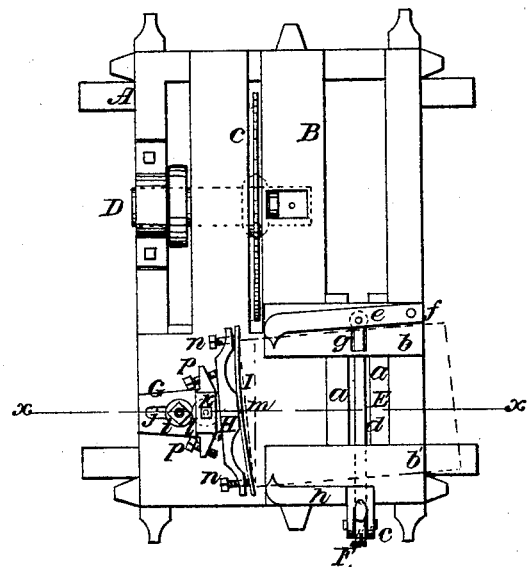

Figure 1, is a transverse vertical section of a shingle machine with our improvements applied to it. $x\ x$ Fig. 2, indicates the plane of section. Fig. 2, is a plan or top view of ditto.

Similar letters of reference indicate corresponding parts in the two figures.

This invention relates to an improvement in that class of shingle machines in which a circular saw is employed for cutting the shingles from the bolt and the bolt fed to the saw by hand.

The invention is designed to facilitate the manual operation of such machines and enable the operator to present the bolt obliquely to the saw so that the shingles may be sawed therefrom in taper form and cut butt and point alternately from either end of the bolt.

To enable those skilled in the art to fully understand, construct and use our invention we will proceed to describe it.

A, represents a framing constructed in any suitable way, and B, is a platform placed thereon.

C, is a circular saw, the arbor D, of which is placed on the upper part of the framing.

E, is a carriage which is placed on the framing A, and allowed to slide freely between suitable guides thereon. This carriage is formed of two parallel bars $a, a$, which have metal plates $b, b'$, secured transversely to their ends said plates projecting over on the platform B, nearly to the cutting plane of the saw C. To the plate $b'$, a lever F, is attached by a fulcrum pin $c$, and to the lower end of this lever a rod $d$, is attached, said rod being between the bars $a, a$, and having its inner end attached to a jaw $e$, which is secured by a pivot $f$, to the upper surface of the plate $b$, the inner end of the rod $d$, being attached to the jaw $e$, by a pivot which passes up through a slot $g$, in the plate $b$. To the upper surface of the plate $b'$, a stationary jaw $h$, is attached.

On the platform B, a bent bar G, is attached by a screw bolt $i$, said screw bolt passing through an oblong slot $j$, in the bar G. To the upright portion of this bent plate a bar H, is attached by a pin $k$, said pin passing through a projection $l$, at the outer side of the bar H. To the inner or face side of bar H, a metal plate I, is attached at its center as shown at $m$, and through the bar H, near each end a set screw $n$, passes, the ends of said screws bearing against the ends of plates I, see Fig. 2.

To the vertical part of the bent bar G, at each side, there is a horizontal projection $o$, through each of which a set screw $p$, passes.

The operation is as follows:—The bolt from which the shingles are cut is placed on the plates $b, b'$, and is secured by the operator shoving forward the upper end of lever F, as he moves the bolt to the saw, the dogging of the bolt and the forward movement of the carriage being simultaneous. The side of the bolt adjoining the saw rests or bears against the plate I, of the bar H, which is moved obliquely with the saw C, at the termination of the backward movement of the carriage F, and alternately in opposite positions so as to cause the shingles to be sawed in taper form, the obliquity of bar H, and consequently the taper of the shingles being determined by the set screws $p$, which may be adjusted as desired. By adjusting the set screws $n$, the thickness of the shingles may be graduated very nicely as the ends and bearing surfaces of plate I, are thereby thrown out, the plate I, having a certain degree of elasticity to cause its ends to spring back when the screws $n$, are unscrewed.

This invention is extremely simple and it may be applied to any circular saw, arranged in the ordinary way, the saw being used for other purposes when desired.

Having thus described our invention what we claim as new and desire to secure by Letters Patent, is,

The adjustable bar H, and the carriage E, provided with the adjustable dog $e$, connected with the hand lever F, the whole being arranged for joint operation as and for the purpose set forth.

WM. H. YATES.
GEORGE YATES.

Witnesses:
PETER WALRALS,
JAIMS FRENCH.